(12) United States Patent
Sato et al.

(10) Patent No.: US 10,576,925 B2
(45) Date of Patent: Mar. 3, 2020

(54) AIRBAG DEVICE

(71) Applicant: HONDA MOTOR CO., LTD., Minato-Ku, Tokyo (JP)

(72) Inventors: Takashi Sato, Wako (JP); Futoshi Miyakawa, Wako (JP); Kyosuke Korenaga, Tokyo (JP); Kohei Oshima, Wako (JP); Yuki Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 15/865,556

(22) Filed: Jan. 9, 2018

(65) Prior Publication Data

US 2018/0208145 A1    Jul. 26, 2018

(30) Foreign Application Priority Data

Jan. 23, 2017  (JP) ................................. 2017-009794

(51) Int. Cl.
| | |
|---|---|
| B60R 21/231 | (2011.01) |
| B60R 21/239 | (2006.01) |
| B60R 21/2346 | (2011.01) |
| B60R 21/26 | (2011.01) |
| B60R 21/00 | (2006.01) |

(52) U.S. Cl.
CPC .......... *B60R 21/231* (2013.01); *B60R 21/239* (2013.01); *B60R 21/2346* (2013.01); *B60R 21/26* (2013.01); *B60R 2021/0088* (2013.01)

(58) Field of Classification Search
CPC . B60R 21/231; B60R 21/2346; B60R 21/239; B60R 21/26; B60R 2021/0088
See application file for complete search history.

(56) References Cited

U.S. PATENT DOCUMENTS

| | | | |
|---|---|---|---|
| 8,622,418 B2* | 1/2014 | Chun | B60R 21/231 280/730.1 |
| 2005/0062265 A1* | 3/2005 | Hotta | B60R 21/206 280/730.1 |
| 2007/0200321 A1* | 8/2007 | Heitplatz | B60R 21/206 280/730.1 |

(Continued)

FOREIGN PATENT DOCUMENTS

| | | |
|---|---|---|
| DE | 10 2010 030 194 A1 | 12/2011 |
| JP | 2015-145152 A | 8/2015 |

OTHER PUBLICATIONS

Extended European Search Report dated Mar. 14, 2018 issued on the corresponding European Patent Application 18152044.6.

(Continued)

*Primary Examiner* — Drew J Brown
(74) *Attorney, Agent, or Firm* — Carrier Blackman & Associates, P.C.; William D. Blackman; Joseph P. Carrier

(57) ABSTRACT

Gas is properly fed into a head facing portion while upsizing of an inflator is prevented. Throttle portions are provided for coupling between a frontal side and a backside of an airbag between a neck portion and a head facing portion. Seams are formed as contours of the throttle portions positioned outermost the airbag in a width direction. The seams are parallel to side edge portions, of the airbag positioned outside the seams in the width direction. Seams are formed as contours opposed to the throttle portions arranged adjacent to each other. The seams are approximately parallel to each other.

8 Claims, 11 Drawing Sheets

(56) References Cited

U.S. PATENT DOCUMENTS

| | | | |
|---|---|---|---|
| 2010/0270780 A1* | 10/2010 | Moritani | B60R 21/206 280/730.1 |
| 2011/0095512 A1* | 4/2011 | Mendez | B60R 21/206 280/730.1 |
| 2011/0101660 A1* | 5/2011 | Schneider | B60R 21/206 280/731 |
| 2012/0025498 A1* | 2/2012 | Tanaka | B60R 21/233 280/730.2 |
| 2014/0159353 A1 | 6/2014 | Stemp | |

OTHER PUBLICATIONS

U.S. Appl. No. 15/864,522, filed Jan. 8, 2018.
U.S. Appl. No. 15/867,272, filed Jan. 10, 2018.

* cited by examiner

AIRBAG DEVICE

INCORPORATION BY REFERENCE

The present application claims priority under 35 U.S.C. § 119 to Japanese Patent Application No. 2017-009794 filed on Jan. 23, 2017. The content of the application is incorporated herein by reference in its entirety.

Technical Field

The present invention relates to an airbag device.

Background Art

For the airbag devices, a configuration is disclosed which includes an airbag that is increased in width from a neck portion in a fanned-out manner between a head facing portion and the neck portion through which gas is introduced (see, e.g., Patent Literature 1). In Patent Literature 1, a pair of left and right first throttle portions is formed in a range from the neck portion to the head facing portion, and in the left and right first throttle portions, the frontage of the airbag on the occupant side and the backside on the opposite side from the occupant are coupled to each other. The pair of left and right first throttle portions forms a plurality of pillar-shaped gas chambers, each of the pillar-shaped chambers extending in a vertical direction upon airbag deployment, the pillar-shaped gas chambers being arranged side-by-side in the vehicle width direction.

CITATION LIST

Patent Literature

[Patent Literature 1] JP-A No. 2015-145152

SUMMARY OF INVENTION

Technical Problem

However, in the conventional configuration, because the pair of left and right first throttle portions is arranged to increase a distance between throttle portions with an extension from the neck portion toward the head facing portion, all the gas chambers are increased in width as the gas chambers approach the head facing portion. Because of this, the volume of the area from the neck portion to the head facing portion is increased. The greater the volume, the larger size of the inflator is required.

Accordingly, it is an object of the present invention to feed gas into a head facing portion in an appropriate manner while upsizing of an inflator is prevented.

Solution to Problem

To achieve the above object, an aspect of the present invention provides an airbag device that includes an airbag (40) and throttle portions (51). The airbag (40) is formed in a bag shape to deploy by being supplied with gas, and the airbag (40) is increased in width gradually from a neck portion (41) between a head facing portion (42) and the neck portion (41) through which the gas is introduced. The throttle portions (51) provides coupling of parts of a frontal side and a backside of the airbag (40) to each other to narrow an internal space between the neck portion (41) and the head facing portion (42). In the airbag device, the throttle portions (51) are formed at intervals in a width direction of the airbag (40). Contours (51A) of the throttle portions (51) positioned outermost in the width direction are parallel to the side edge portions (40L, 40R) of the airbag (40) positioned outside the contours (51A) in the width direction, and contours (51B) opposed to the throttle portions (51) arranged adjacent to each other are approximately parallel to each other.

In the above configuration, separation distances (W1, W3) between the throttle portions (51) positioned outermost in the width direction and the side edge portions (40L, 40R) of the airbag (40) positioned outside the throttle portions (51) in the width direction may be equal to a separation distance (W2) between the throttle portions (51) arranged adjacent to each other.

Further, in the above configuration, separation distances (W1, W3) between the throttle portions (51) positioned outermost in the width direction and the side edge portions (40L, 40R) of the airbag (40) positioned outside the throttle portions (51) in the width direction may be greater than a separation distance (W2) between the throttle portions (51) arranged adjacent to each other.

Further, in the above configuration, each of the throttle portions (51) may have a shape in which a width is increased gradually with an extension from the neck portion (41) toward the head facing portion (42). Further, in the above configuration, the throttle portions (51) may be formed by seaming the frontal side and the backside of the airbag (40) together along the contours of the throttle portions (51). Further, in the above configuration, the airbag (40) may include reinforcing fabrics (63, 64) placed in regions of the throttle portions (51).

Advantageous Effects of Invention

In the aspect of the present invention, the throttle portions are formed between the neck portion and the head facing portion to be spaced in the width direction of the airbag, and the throttle portions join parts of the frontal side and the backside of the airbag to each other to narrow the internal space. Throttle portions are located outermost in the width direction, and the contours of the throttle portions are parallel to the corresponding side edge portions of the airbag, the side edge portions being located outside the contours in the width direction. The contours opposed to the throttle portions arranged adjacent to each other are approximately parallel to each other. With the configuration, while the volume in the region from the neck portion to the head facing portion is reduced, a plurality of pillar-shaped gas chambers is able to be formed to extend from the neck portion toward the head facing portion. Accordingly, proper feeding of gas into the head facing portion is enabled while upsizing of the inflator is prevented.

Further, the separation distances between the throttle portions positioned outermost in the width direction and side edge portions of the airbag positioned outside the throttle portions in the width direction are equal to the separation distance between the throttle portions arranged adjacent to each other. This is able to make a plurality of gas chambers identical in width, and thus the gas is easily caused to flow equally into the gas chambers.

Further, separation distances between the throttle portions positioned outermost in the width direction and the side edge portions of the airbag positioned outside the throttle portions in the width direction are greater than the separation distance between the throttle portions arranged adjacent to each other. This facilitates causing the gas to flow into the widthwise outward gas chambers, and therefore the retention of the outer shape of the airbag during airbag deployment is facilitated.

Further, the throttle portion has a shape in which a width is increased gradually with an extension from the neck portion toward the head facing portion. This makes it possible to facilitate forming linear-shaped gas chambers between the side edge portions of the airbag with a fan shape between the neck portion and the head facing portion. Accordingly, the smooth feeding of gas into the head facing portion is facilitated.

Further, the throttle portions are formed by seaming the frontal side and the backside of the airbag together along the contours of the throttle portions. As a result, the throttle portion can be formed through sewing, so that any dedicated component to form the throttle portion is unnecessary.

Further, the airbag includes the reinforcing fabrics placed in regions of the throttle portions. As a result, the region of the throttle portions is reinforced, and therefore the influence of gas can be curbed.

DESCRIPTION OF EMBODIMENTS

Embodiments according to the present invention will now be described with reference to the drawings.

It is noted that, throughout the description, references to directions such as front, rear, left, right, up and down directions are made with reference to a vehicle body unless otherwise stated. It is also noted that, in all the drawings, reference sign FR denotes the forward direction of the vehicle body, reference sign UP denotes the upward direction of the vehicle body, and reference sign RH denotes the rightward direction of the vehicle body.

Figure 1:
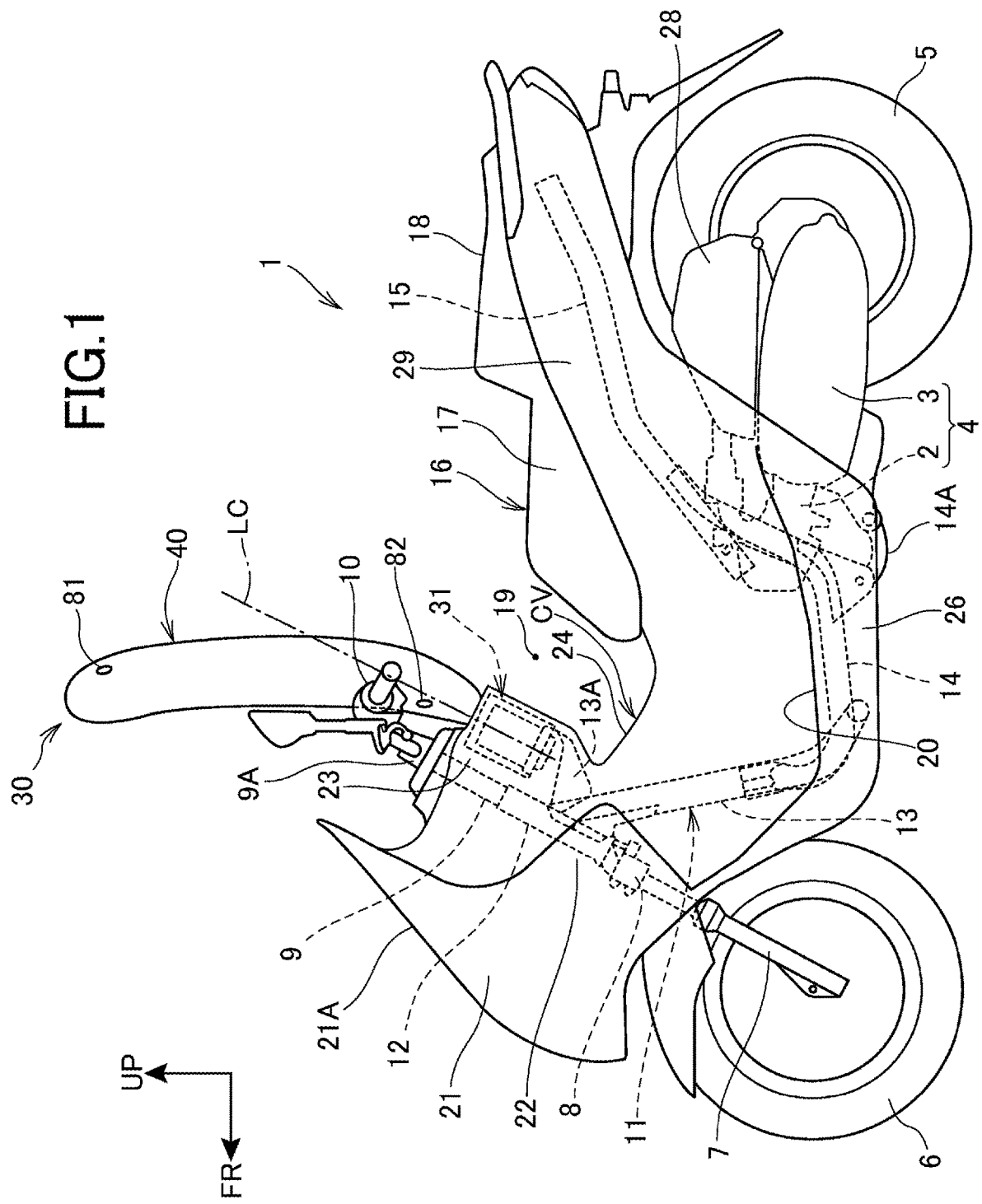
FIG. 1 is a left side view of a motorcycle equipped with an airbag device according to an embodiment of the present invention.

FIG. 1 is a left side view of a motorcycle 1 with an airbag device 30 according to an embodiment of the present invention. FIG. 1 illustrates the state in which an airbag 40 deploys and expands.

The motorcycle 1 includes a swing unit 4. The swing unit 4 is formed of a combination of an engine 2 and a power transmission mechanism 3. A rear wheel 5 of the motorcycle 1 is rotatably supported at a rear portion of the swing unit 4, while a front wheel 6 is rotatably supported at a lower portion of a pair of left and right front forks 7. A bridge 8 is placed across the upper portions of the pair of left and right front forks 7. A steering shaft 9 is arranged upright at the center in the vehicle width direction of the bridge 8. A handlebar post 9A is provided on an upper portion of the steering shaft 9. A handlebar 10 is attached to the handlebar post 9A, and the handlebar 10 is provided for steering the motorcycle 1 to the left/right. The steering system (steering device) of the motorcycle 1 is made up of the front wheel 6, the front forks 7, the steering shaft 9, the handlebar 10 and the like.

A body frame 11 includes a head pipe 12 and a main frame 13. The head pipe 12 supports rotatably the steering shaft 9. The main frame 13 extends downward from the head pipe 12 to the rear. The body frame 11 further includes a pair of left and right side frames 14 and a pair of left and right seat frames 15. After the left and right side frames 14 extend rearward from a lower portion of the main frame 13, the left and right side frames 14 extend upwardly toward the rear. The left and right seat frames 15 extend upwardly from rear portions of the side frames 14 toward the rear.

The swing unit 4 is supported via a link member 14A at lower rear portions of the pair of left and right side frames 14, and the swing unit 4 is supported in a vertically swingable manner. An air cleaner 28 is mounted on an upper portion of the swing unit 4. The air cleaner 28 is connected to the engine 2 through a not-shown throttle body and/or the like. The seat frames 15 support a seat 16 on which the occupant is to sit. The seat 16 is configured as an integral-type seat, the seat including a combination of a main seat 17 and a pillion set 18. The rider sits on the main seat 17 and a pillion passenger sits on the pillion seat 18. The seat 16 is placed rearward and downward of the handlebar 10.

The motorcycle 1 is covered with a resin-made body cover CV. The body cover CV includes a front cover 21 and a pair of left and right front side covers 22. The front cover 21 covers a body front section from front. The left and right front side covers 22 extend rearward from the left side and right side of the front cover 21 to cover the left side and right side of the body front portion, respectively. A visor (also called "windscreen") 21A is mounted on an upper portion of the front cover 21. The visor 21A is raised rearward from the front in a rearward and upward direction in side view so as to guide the traveling air from the front in the rearward and upward direction.

An inner cover 23 is installed to the pair of left and right front side covers 22 from the rear. The steering shaft 9, the head pipe 12, a retainer 31 of the airbag device 30, and the like are placed between the front side covers 22 and the inner cover 23.

The retainer 31 is a member for housing an airbag 40. The retainer 31 is placed immediately behind the steering shaft 9 and the head pipe 12 by being supported by a stay 13A. The stay 13A extends rearward from an upper portion of the main frame 13 to support the retainer 31.

A center cover 24 is continuous with a lower portion of the inner cover 23. The center cover 24 constitutes a cover for covering the main frame 13 from the upward and rearward direction, the cover being located on the inner side between both feet of the rider when he/she is sitting on the main seat 17. Also, the center cover 24 serves as a leg straddle portion over which the rider's leg steps when he/she gets on/off the motorcycle 1.

A pair of left and right rear side body covers 29 is placed rearward of the center cover 24. Each of the pair of left and right rear side body covers 29 covers an area below the seat 16, and also the left and right rear side body covers 29 extend in the vehicle longitudinal direction to cover a body rear section from the left and right sides.

A pair of left and right step floors 20 on which the occupant rests his/her feet is placed in a central lower area in the vehicle longitudinal direction. The step floors 20 are continuous with lower portions of the center cover 24, and the step floors 20 extend in the vehicle longitudinal direction at a location downward of a front portion of the seat 16. Under cowls 26 cover areas below the step floors 20.

Above the center cover 24, a straddle space 19 is created between the handlebar 10 and the seat 16. The occupant passes his/her leg through the straddle space 19 in order to ride on the motorcycle 1. In order to ride the motorcycle 1, the rider (occupant) passes his/her leg through the straddle space 19, then the rider (occupant) sits on the seat 16 (main seat 17), and then the rider (occupant) rests his/her legs on the left and right step floors 20, the left and right step floors 20 being provided in a central lower area in the vehicle longitudinal direction.

The retainer 31 of the airbag device 30 is provided in the straddle space 19. That is, while the airbag 40 is housed within the retainer 31, the airbag device 30 is provided in the straddle space 19. The retainer 31 is placed to be inclined upwardly toward the rear to extend along a rear wall of the inner cover 23. This enables ensuring of a wide straddle space 19 even if the airbag device 30 is located. By virtue of this, the ease of getting on/off is able to be maintained for the occupants. Incidentally, reference sign LC in FIG. 1 indicates the center axis of the retainer 31, and the center axis LC is inclined upwardly toward the rear at the center of the vehicle width direction.

The airbag device 30 includes the retainer 31, the airbag 40 and a single inflator 32. The airbag 40 is housed within the retainer 31. The airbag 40 is formed by sewing base fabric. The inflator 32 delivers gas (gaseous matter) into the airbag 40 to cause the airbag 40 to deploy and expand.

Figure 2:
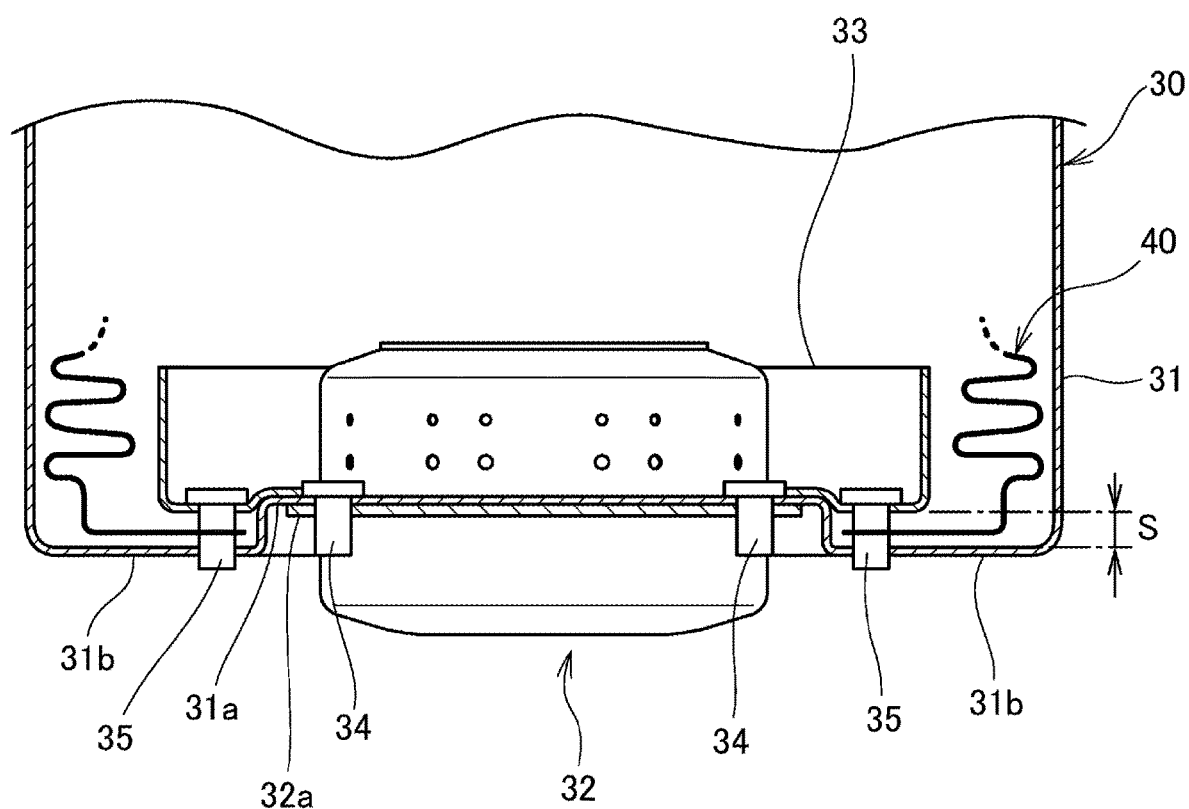
FIG. 2 is a diagram illustrating a sectional structure of a retainer of the airbag device as well as the peripheral configuration.

FIG. 2 is a diagram illustrating a sectional structure of the retainer 31 as well as the peripheral configuration. Incidentally, FIG. 2 shows the airbag 40 in a folded state.

The retainer 31 is a box body. The box body has a lid member on a top portion. The lid member is opened by receiving a reactive force upon deployment of the airbag 40. The retainer 31 has a mounting hole formed in a bottom plate 31a. The mounting hole is formed in order to attach the inflator 32. The inflator 32 has a flange 32a of a larger diameter than the mounting hole. The inflator 32 is inserted into the mounting hole until the flange 32a abuts on the underside of the bottom plate 31a.

The flange 32a and the bottom plate 31a are fastened together at spaced positions in the circumferential direction with a plurality of fastening members 34. Thus, the inflator 32 is secured to the retainer 31.

A bag ring (also called a "retainer plate") 33 is placed on the top surface of the bottom plate 31a. The bag ring 33 is formed to have a larger diameter than that of the flange 32a. A spot of a larger diameter of the bag ring 33 than the flange 32a is fastened to the bottom plate 31a of the retainer 31 at spaced positions in the circumferential direction with a plurality of fastening members 35.

As illustrated in FIG. 2, a lower portion of the airbag 40 is inserted through the fastening members 35 between the bag ring 33 and the bottom plate 31a of the retainer 31. A shoulder 31b is formed in the bottom plate 31a of the retainer 31, and the shoulder 31b protrudes downward toward the rim beyond the abutting spot of the flange 32a. Thus, in a position outside the rim of the flange 32a, clearance S is created between the bag ring 33 and the bottom plate 31a of the retainer 31.

That is, in the configuration, the bottom plate 31a of the retainer 31 is provided with the shoulder 31b, and the shoulder 31b protrudes downward to create the clearance S between the bag ring 33 and the shoulder 31b. Then, the bag ring 33 and the shoulder 31b are fastened together with the fastening members 35 so that the bag ring 33 and the retainer 31 are secured together. In addition, the airbag 40 is attached in the area of the clearance S in which the fastening members 35 are located.

In this manner, the airbag 40 is able to be attached through the use of the fastening members 35 for the securing of the bag ring 33 and the retainer 31 to each other, and also the attachment spot of the airbag 40 is able to be spaced downward from the bag ring 33. Accordingly, the attachment spot of the airbag 40 is not more easily affected by pressure and/or temperature of gas in the bag ring 33, and this can cause further improvement in thermal toughness.

Note that the storage state of the airbag 40 may be set to be in a roll form, accordion form or the like as appropriate with consideration of parameters such as a deployment direction of the airbag 40, a deployment speed of the airbag 40, and/or the like.

The motorcycle 1 is equipped with an acceleration sensor (not shown) for detecting impact. The acceleration sensor is electrically connected to a controller (not shown), and in turn the controller is electrically connected to the inflator 32. Based on the detected acceleration, the controller determines at once whether the airbag 40 should be activated or not activated. If activation is determined, the inflator 32 is activated to deliver gas into the airbag 40 so that the airbag 40 deploys and also inflates. Hereinafter, "to deploy and also inflate" will be represented as "deployment inflation" as appropriate.

Figure 3:
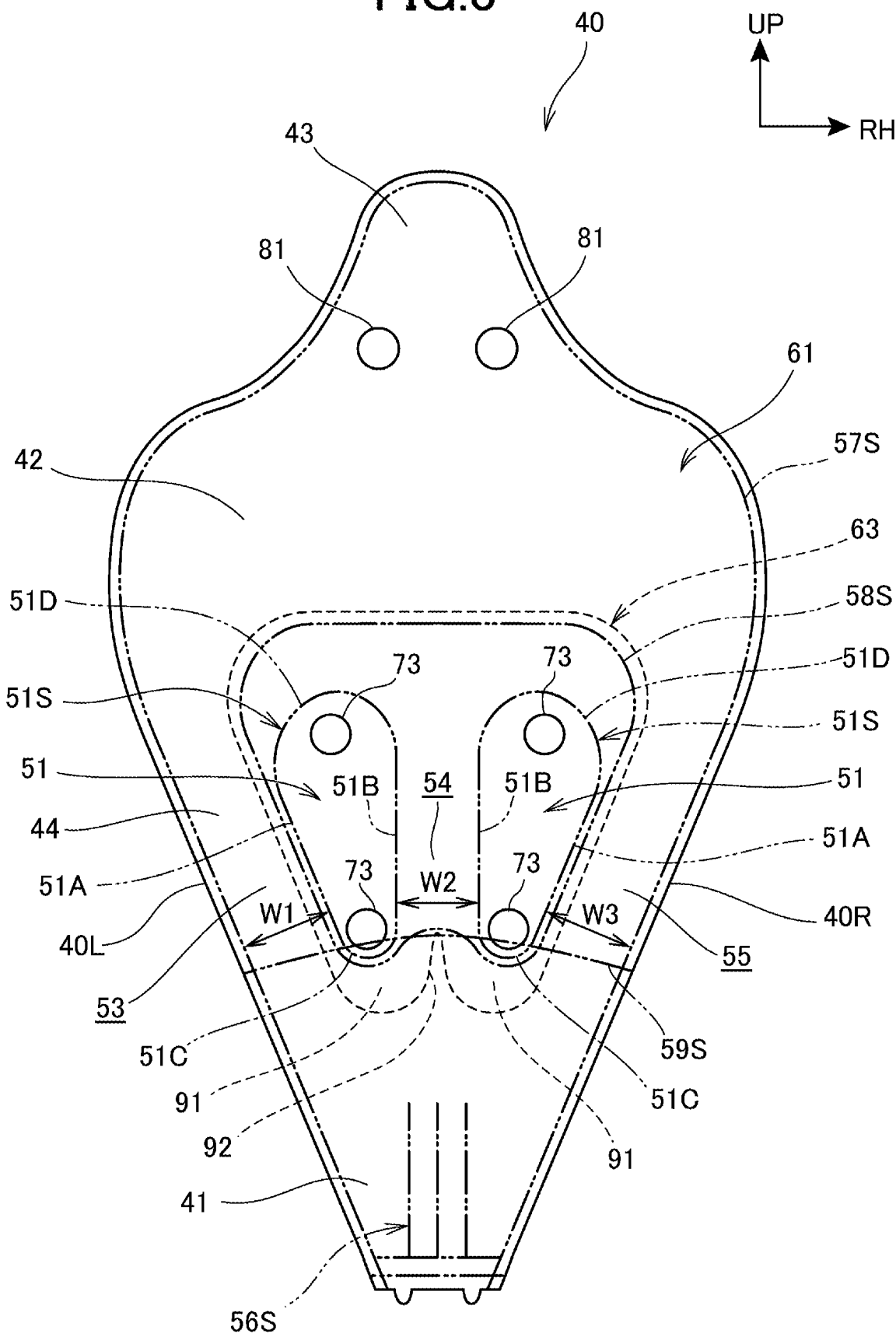
FIG. 3 is a view of a deploying inflating airbag when viewed from the frontal side (the occupant side).
Figure 4:
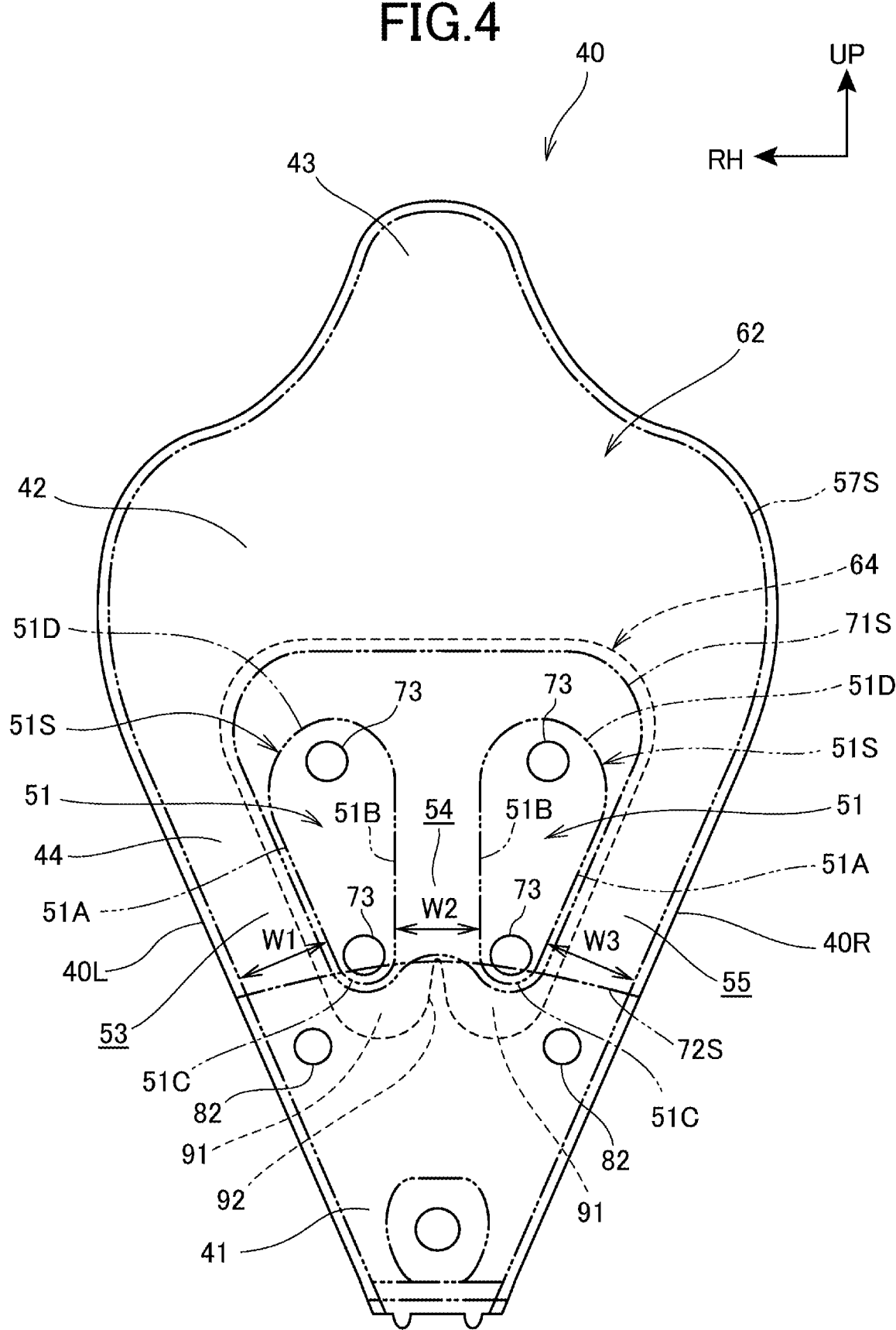
FIG. 4 is a view of the deploying inflating airbag when viewed from the backside (the side opposite from the occupant).

FIG. 3 is a view of the deploying inflating airbag 40 when viewed from the frontal side (the occupant side). FIG. 4 is a view of the deploying expanding airbag 40 when viewed from the backside (the side opposite from the occupant).

The airbag 40 has a bag shape of which the width is increased gradually (fanned out) from a neck portion 41 toward the top. The neck portion 41 serves as an entering port through which gas is introduced from the inflator 32. In the airbag 40, a maximum width spot forms a head facing portion 42. The head facing portion 42 is a portion that is to face the head of the occupant during inflation deployment of the airbag 40.

An abut portion 43 is formed integrally with a top portion of the head facing portion 42. The abut portion 43 constitutes the uppermost portion of the airbag 40. The abut portion 43 is a portion that is to abut on a collision object during inflation deployment of the airbag 40. The collision object exists forward (in front of the occupant). The abut portion 43 is formed in a protrusion shape, and the protrusion shape protrudes upward from a widthwise central region of the head facing portion 42.

A linking portion 44 links the neck portion 41 and the head facing portion 42 to each other, and the linking portion 44 is raised upward from the motorcycle 1 upon deployment inflation of the airbag 40 to support the head facing portion 42 from below. In the linking portion 44, a plurality (two in the embodiment) of middle-stitched portions (also called throttle portion) 51 is provided. In the middle-stitched portion 51, the frontal side and the backside of the airbag 40 are partially coupled to each other to narrow the interior space. More specifically, along the outer edge of each of the middle-stitched portions 51, the frontal side and the backside of the airbag 40 are made abut on each other while reinforcing fabrics (a first reinforcing fabric 63 and a second reinforcing fabric 64 will be described later) are being placed between the frontal side and the backside, and then the reinforcing fabrics and the frontal side and backside of the airbag 40 are sewn together to form each middle-stitched portion 51.

A seam (also called stitching or stitches) 51S of the middle-stitched portion 51 functions as a partition portion for partitioning the internal space. As a result, gaseous matter such as gas does not enter a region that is surrounded with the seam 51S, and therefore the region results in a throttle region that narrows the internal space. In this manner, while a large head facing portion 42 is provided, the linking portion 44 continuous with the head facing portion 42 is narrowed to a smaller space in order to facilitate quick delivery of gas into the head facing portion 42.

In this connection, in each of FIG. 3, FIG. 4 and later-described drawings, seamed spots such as the seam 51S and/or the like are shown by the dot-dot-dash lines for the purpose of clarification.

In the configuration, a plurality (two in the embodiment) of the middle-stitched portions 51 are formed to be spaced from each other in a lateral direction, so that a plurality (three in the embodiment) of pillar-shaped gas chambers 53, 54, 55 is formed in the vehicle width direction, and each of the gas chambers 53, 54, 55 extends in the vertical direction. And, each of the middle-stitched portions 51 is formed in a shape in which the width is increased gradually with an extension from the neck portion 41 toward the head facing portion 42. This makes it possible to adjust dimensions of widths W1, W2, W3 of the respective gas chambers 53, 54, 55. The gas chamber 53 is formed between the leftmost middle-stitched portion 51 and a left-side edge portion 40L of the airbag 40. The gas chamber 54 is formed between the left and right middle-stitched portions 51. The gas chamber 55 is formed between the right middle-stitched portion 51 and a right-side edge portion 40R of the airbag 40. In the embodiment, the widths W1, W2, W3 are assumed as approximately constant width.

More specifically, the left and right middle-stitched portions 51 are located outermost in the width direction. The middle-stitched portions 51 may also be referred to as throttle portions, because they restrict the flow of air into the airbag 40 during deployment thereof. Left and right outer seams 51A form outer edge parts of contours of the left and right middle-stitched portions 51, respectively. The left and right outer seams 51A include portions which are formed respectively parallel to the side edge portions 40L, 40R of the airbag 40. As seen from the drawing, the parallel portions of the left and right outer seams (outer edge contours) 51A extend more than half of the total length of one of the middle-stitched portions (throttle portions) 51. The side edge portions 40L, 40R are located outside the seams 51A in the width direction. Likewise, a pair of inner seams 51B form portions of the contours opposed to the middle-stitched portions 51 and positioned adjacent to each other. The inner seams 51B include portions which are formed approximately parallel to each other along the vertical direction. As seen from the drawing, the parallel portions of the left and right inner seams (inner edge contours) 51B extend more than half of the total length of one of the middle-stitched portions (throttle portions) 51.

As a result, the three gas chambers 53, 54, 55 are defined, and the three gas chambers 53, 54, 55 extend linearly in constant width from the neck portion 41 toward the head facing portion 42. Accordingly, as compared with the case where the middle-stitched portions 51 are not formed, the volume of the airbag 40 can be reduced, a relatively smaller inflator 32 can be used than would otherwise be required, and upsizing of the inflator 32 can be prevented.

Further, each of the gas chambers 53, 54, 55 is formed to have the same width W1, W2, W3 throughout from top to bottom. This makes it possible to equalize the cross-sectional areas of the respective gas chambers 53, 54, 55, and gas can be easily flown equally into the respective gas chambers 53, 54, 55. Further, the linking portion 44 is reinforced during deployment inflation by each gas chamber 53, 54, 55, and therefore the advantageous effect of preventing the swaying of the head facing portion 42 can be expected.

The widths W1, W2, W3 of the respective gas chambers 53, 54, 55 are not limited to being exactly equal to each other, and the gas chambers 53, 54, 55 may have approximately the same width. Approximately the same width means a width within a range in which the equivalent effects are produced.

The left middle-stitched portion 51 includes the pair of left and right seams 51A, 51B, a lower seam 51C and an upper seam 51D. The left and right seams 51A, 51B extend linearly. The lower seam 51C joins the lower ends of the left and right seams 51A, 51B to each other along a downward convex arc. The upper seam 51D joins the upper ends of the left and right seams 51A, 51B to each other along an upward convex arc. The right middle-stitched portion 51 includes the pair of left and right seams 51A, 51B, a lower seam 51C and an upper seam 51D. The left and right seams 51A, 51B extend linearly. The lower seam 51C joins the lower ends of the left and right seams 51A, 51B to each other along a downward convex arc. The upper seam 51D joins the upper ends of the left and right seams 51A, 51B to each other along an upward convex arc.

In this manner, each of the left and right middle-stitched portions 51 has the seam 51S. The seam 51S extends continuously in an endless form along the outer edge of an oval shape (or along the outer edge of a downward protruding triangular shape). The oval shape is increased in width gradually toward the apex.

In the seam 51S, the lower seam 51C is formed in a downward convex form, so that the lower seam 51C has not only the function as a partition that partitions the inside of the airbag 40, but also the function as a lower guide that smoothly guides the flow of gas from the bottom into each of the gas chambers 53, 54, 55. In turn, the upper seam 51D is formed in an upward convex form, so that the upper seam 51D has not only the function as a partition, but also the function as an upper guide that smoothly guides the flow of gas from each of the gas chambers 53, 54, 55 into the head facing portion 42. Note that, although, in the embodiment, the airbag 40 is formed in bilaterally symmetric structure with respect to the widthwise center of the airbag 40, the airbag 40 may not be limited to being formed in the bilaterally symmetric structure.

As illustrated in FIG. 3, in base fabric 61 on the frontal side of the airbag 40 (hereinafter referred to as "frontal-side base fabric" 61), a plurality (three) of seams 56S is formed in positions corresponding to the neck portion 41. The seams 56S extend linearly in the vertical direction. The seams 56S are spaced in the width direction. The seams 56S function as a neck-side guide that guides the gas in the upward direction on the frontal-side base fabric 61 side of the neck portion 41. In order to form the seams 56S, the frontal-side base fabric 61 and an inside located reinforcing fabric (a later-described first layered fabric 65 on the inflator side) are placed to abut on each other, and then the frontal-side base fabric 61 and the inside located reinforcing fabric are sewn together.

Reference sign 57S in FIG. 3 and FIG. 4 indicates a seam at which the frontal-side base fabric 61 of the airbag 40 and a backside base fabric 62 of the airbag 40 (hereinafter referred to as "backside base fabric") 62 are sewn together. Likewise, reference sign 58S in FIG. 3 indicates a seam at which the frontal-side base fabric 61 and reinforcing fabric (a later-described first reinforcing fabric 63) are sewn together, and also reference sign 59S indicates a seam at which the frontal-side base fabric 61 and reinforcing fabric (the later-described first reinforcing fabric 63 and the inflator-side first layered fabric 65) are sewn together.

Further, reference sign 71S in FIG. 4 indicates a seam at which the backside base fabric 62 and reinforcing fabric (a later-described second reinforcing fabric 64) are sewn together, and reference sign 72S indicates a seam at which the backside base fabric 62 and a reinforcing fabric (the later-described second reinforcing fabric 64 and a second layered fabric 66 on the inflator side) are sewn together. Reference sign 73 shown in FIG. 3 and FIG. 4 indicates holes that are bored in the frontal-side base fabric 61 and the backside base fabric 62 to effect positioning of the frontal-side base fabric 61, the first reinforcing fabric 63, the second reinforcing fabric 64, the backside base fabric 62 and the like.

The airbag 40 includes vent holes 81 (FIG. 3) in the frontal-side base fabric 61 and vent holes 82 (FIG. 4) in the backside base fabric 62. The vent holes 81, 82 are gas outlets for the discharge of the gas from the airbag 40 in order to control the internal pressure upon the inflation deployment.

As illustrated in FIG. 3, in the frontal-side base fabric 61, a pair of left and right vent holes (hereinafter referred to as "upper vent holes") 81 is formed in the abut portion 43, and the abut portion 43 is located upward of the head facing portion 42. The left and right vent holes 81 are open to the occupant side. The pair of left and right upper vent holes 81 is placed widthwise outward of an extended line from the laterally centrally located gas chamber 54, and also the left and right upper vent holes 81 are placed widthwise inward of extended lines from the left and right gas chambers 53, 55. With this configuration, during deployment inflation of the airbag 40, the upper vent holes 81 are located upward of the head of the occupant, so that the upper vent holes 81 are not easily blocked. In addition, the upper vent holes 81 are not located directly above any specific gas chamber, so that, after gas has been fed from each of the gas chambers 53, 54, 55 into the head facing portion 42, the gas can be readily discharged in an appropriate manner.

As illustrated in FIG. 4, in the backside base fabric 62, a pair of left and right vent holes (hereinafter referred to as "lower vent holes) 82 is formed in a position downward of the head facing portion 42. The pair of left and right lower vent holes 82 is located downward of the middle-stitched portions 51, and also, as illustrated in FIG. 1, the left and right lower vent holes 82 are located downward of the handlebar 10 during inflation deployment of the airbag 40. With this configuration, during inflation deployment of the airbag 40, the lower vent holes 82 are not blocked with the occupant, and also it is possible to prevent the event that the lower vent holes 82 are blocked with the handlebar 10 and other components (the visor, meters and the like) around the handlebar 10.

Also, as illustrated in FIG. 4, the pair of left and right lower vent holes 82 is placed widthwise outward of the extended line from the laterally central gas chamber 54, and also the left and right lower vent holes 82 are placed widthwise inward of the extended lines from the left and right gas chambers 53, 55. In short, the lower vent holes 82 are placed at entrances of the left and right gas chambers 53, 55, except for the central gas chamber 54. With this configuration, gas flowing toward the central gas chamber 54 is not discharged from the lower vent holes 82 and then the gas can be fed into the head facing portion 42. This makes it easy to feed gas preferentially toward the widthwise center of the head facing portion 42.

In this manner, in the embodiment, because the vent holes 81, 82 are spaced from each other in the upper, lower, forward, backward, left and right directions, the vent holes 81, 82 are not easily blocked to enable internal-pressure regulation on a continual basis. Note that the number of vent holes 81 and the number of vent holes 82 may be set in conformance with requirements specification of the airbag 40, and each of the numbers of vent holes 81, 82 may be one or may be three or more. Further, the position of each vent hole 81, 82 may be changed in conformance with requirements specification of the airbag 40.

Figure 5:
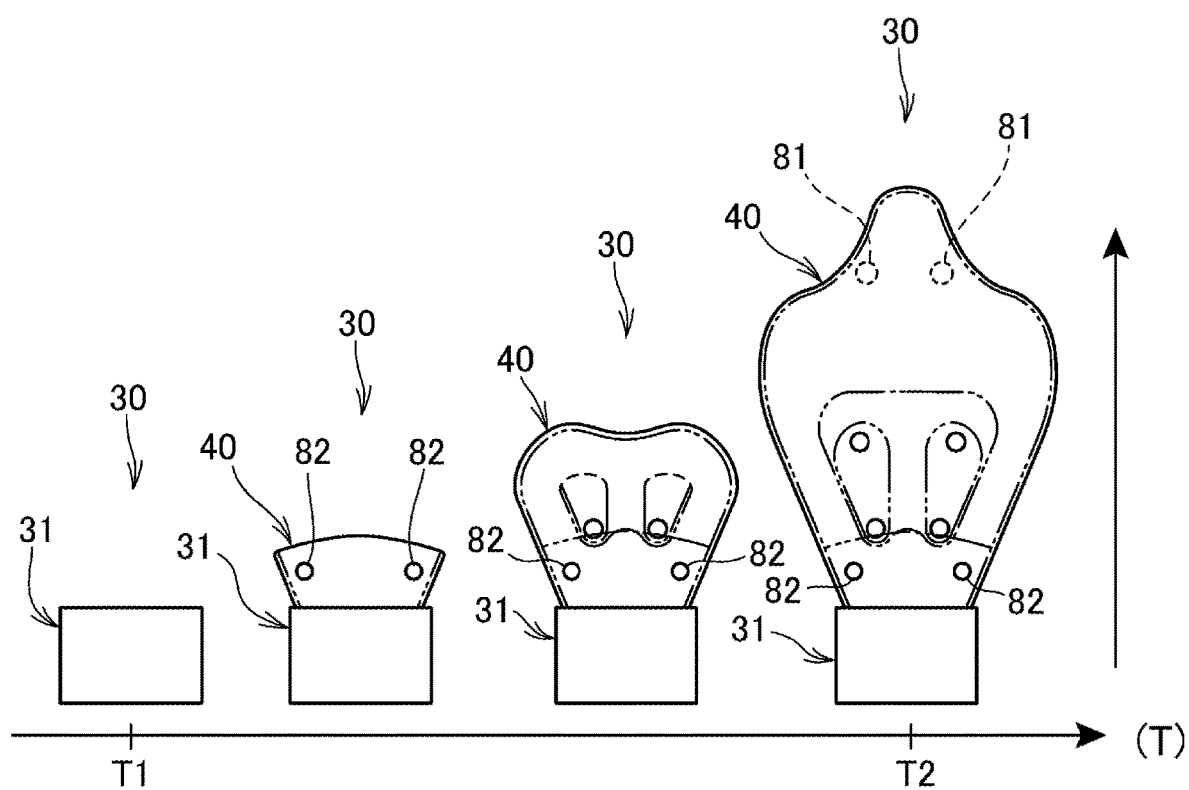
FIG. 5 is a diagram illustrating a deployment status of the airbag on a time-series basis.

FIG. 5 is a diagram illustrating deployment status of the airbag 40 on a time-series basis. In FIG. 5, the horizontal axis represents elapsed time T, time T1 is a time at which the inflator 32 ignites, and time T2 is a time at which deployment has been completed.

As illustrated in FIG. 5, by stretching of the airbag 40 in such a manner as to extend upward with the passage of time, the airbag 40 deploys in the order of the neck portion 41, the linking portion 44 and then the head facing portion 42 (including the abut portion 43). As shown in the same FIG. 5, because the lower vent holes 82 are exposed from initial phase of deployment, the control of internal pressure in the airbag 40 can be started at an early stage. By virtue of the lower vent holes 82, the internal pressure during the process of stretching of the airbag 40 is properly controlled.

Further, the upper vent holes 81 are exposed at which the deployment of the airbag 40 has been completed or immediately before the deployment is completed. Thus, after the completion of deployment, the internal pressure is regulated by the upper and lower vent holes 81, 82, so that the internal-pressure control at the time of contact of the occupant is properly performed. Note that fine adjustments of size, shape and position and the like to each vent hole 81, 82 enables fine adjustment in the internal-pressure control.

Figure 6:
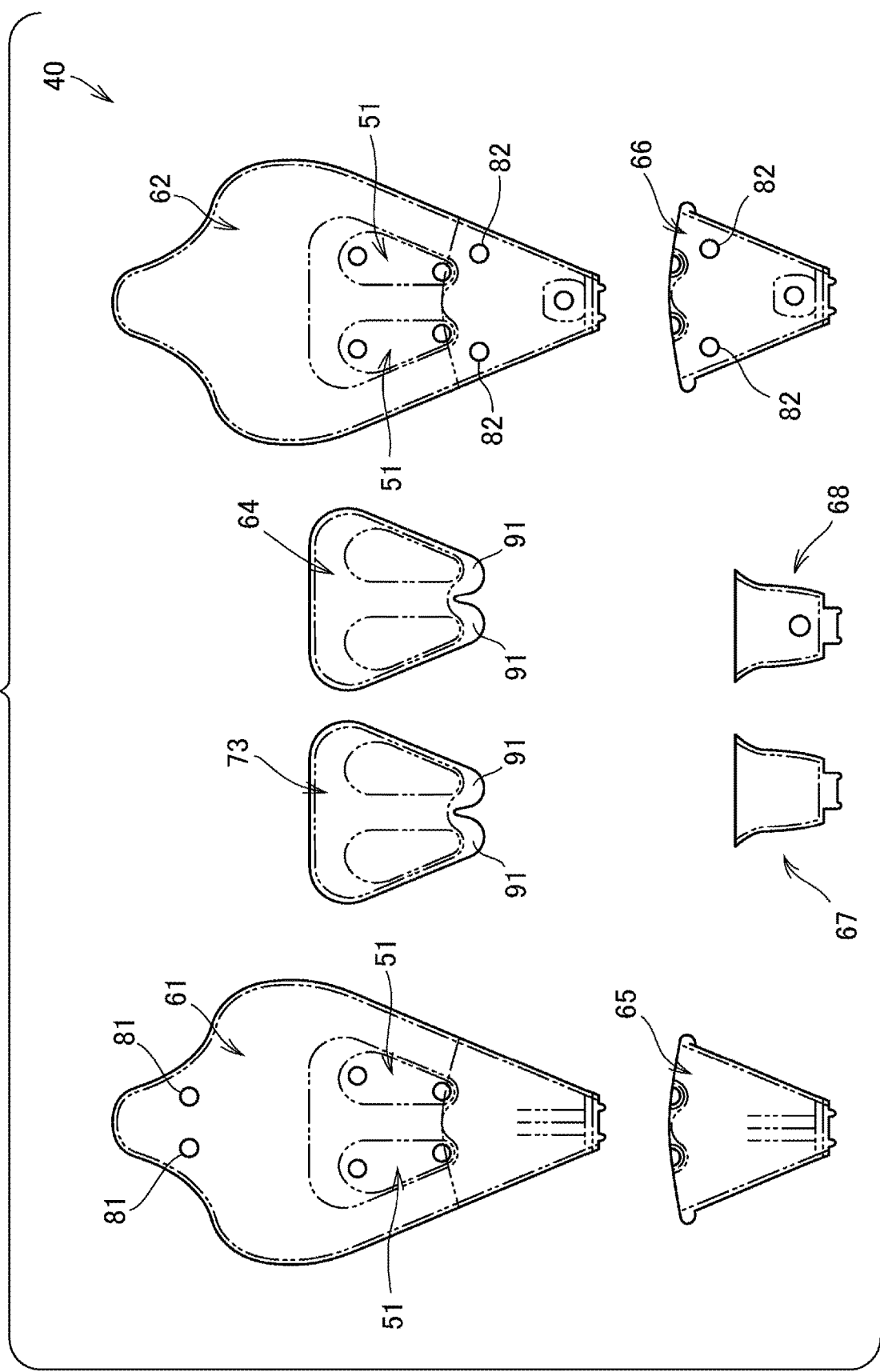
FIG. 6 is an exploded diagram of the airbag.

FIG. 6 is an exploded diagram of the airbag 40.

The airbag 40 includes independently the frontal-side base fabric 61 and the backside base fabric 62. Further, the airbag 40 includes, as reinforcing fabric, the first reinforcing fabric 63; the second reinforcing fabric 64 that is formed in the same shape as that of the first reinforcing fabric 63; the inflator-side first layered fabric 65; and the inflator-side second layered fabric 66. Still further, the airbag 40 includes layered fabrics 67, 68. The layered fabrics 67, 68 are laid on lower portions of the inflator-side first layered fabric 65 and the inflator-side second layered fabric 66, and the layered fabrics 67, 68 are provided for improvements in heat resistance and strength in a spot to which the high temperature and high pressure gas from the inflator 32 is delivered first.

As illustrated in FIG. 3, the first reinforcing fabric 63 is laid on the inner side of the frontal-side base fabric 61 and also on the region of the middle-stitched portion 51, and the first reinforcing fabric 63 is sewn to the frontal-side base fabric 61 by the seam 58S along the outer periphery of the first reinforcing fabric 63. The heat resistance and strength in the region of the middle-stitched portion 51 on the frontal-side base fabric 61 side are improved by the first reinforcing fabric 63.

As illustrated in FIG. 4, the second reinforcing fabric 64 is laid on the inner side of the backside base fabric 62 and also on the region of the middle-stitched portion 51, and the second reinforcing fabric 64 is sewn to the backside base fabric 62 by the seam 71S along the outer periphery of the second reinforcing fabric 64. The heat resistance and strength in the region of the middle-stitched portion 51 on the backside base fabric 62 side are improved by the second reinforcing fabric 64.

FIG. 6 shows the inflator-side first layered fabric 65 and the layered fabric 67, and the inflator-side first layered fabric 65 and the layered fabric 67 are laid one on top of another on the inner side of the frontal-side base fabric 61 and also on a region where the neck portion 41 is covered, and then the inflator-side first layered fabric 65 and the layered fabric 67 are sewn to the frontal-side base fabric 61 by the seam 56S and the like as shown in FIG. 3. Thus, the strength and heat resistance in the neck portion 41 on the frontal-side base fabric 61 are improved. In this connection, the inflator-side first layered fabric 65 is laid on the region from the neck portion 41 to the first reinforcing fabric 63 to improve the strength and heat resistance in the area from the neck portion 41 to the middle-stitched portion 51.

The inflator-side second layered fabric 66 and the layered fabric 68 are laid one on top of another on the inner side of the backside base fabric 62 and also on a region where the neck portion 41 is covered, and then the inflator-side second layered fabric 66 and the layered fabric 68 are joined to the backside base fabric 62 by sewing and/or the like. Thus, the strength and heat resistance in the neck portion 41 on the backside base fabric 62 are improved. In this connection, the inflator-side second layered fabric 66 is laid on the region from the neck portion 41 to the second reinforcing fabric 64 to improve the strength and heat resistance in the area from the neck portion 41 to the middle-stitched portion 51.

Figure 7:
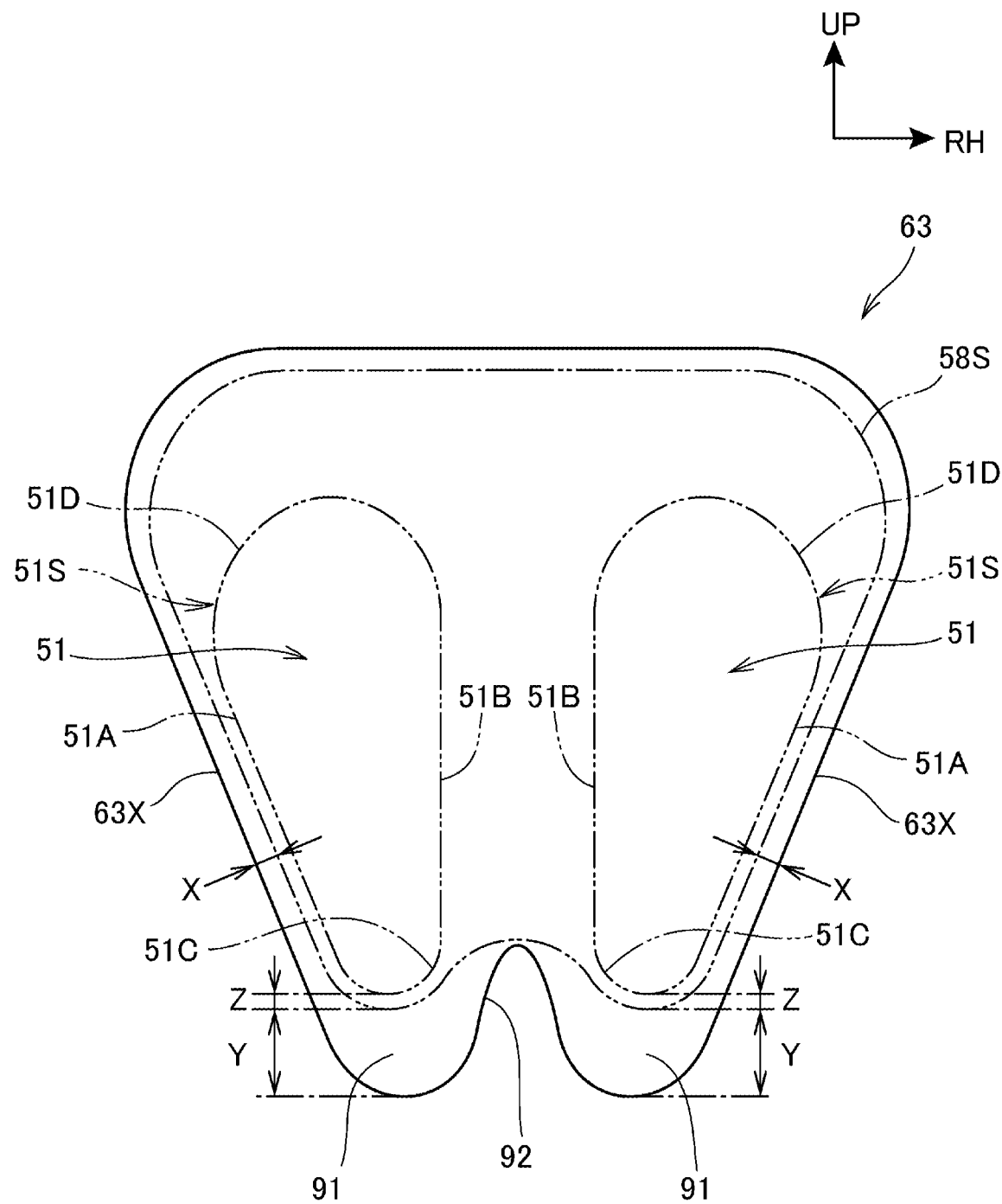
FIG. 7 is a top view of a first reinforcing fabric of the airbag.

FIG. 7 is a top view of the first reinforcing fabric 63. Incidentally, FIG. 7 shows the seams 51S, 58S for convenience in description. Note that the second reinforcing fabric 64 is similar to the first reinforcing fabric 63, except that the second reinforcing fabric 64 is attached to the backside base fabric 62, and therefore a repetitive description is omitted.

The first reinforcing fabric 63 has a shape with a width fanned out toward the top, and the first reinforcing fabric 63 is formed into an approximately trapezoidal sheet to cover the pair of left and right middle-stitched portions 51. Between the outer edge of the first reinforcing fabric 63 and the seams 51S of the middle-stitched portions 51, space is created for the seam 58S along which at least the first reinforcing fabric 63 is sewn. Further, the first reinforcing fabric 63 has a side edge 63X on the outer side in the vehicle width direction, and assuming that value X is a separation distance between the side edge 63X of the first reinforcing fabric 63 and the seam 58S, the distance between the lower edge of the first reinforcing fabric 63 and the seam 58S is set to be greater value Y than value X (value Y>value X). The value Y is set to be greater than distance Z between the seam 58S and the seam 51S (value Y>value Z), and the seam 51S forms part of the middle-stitched portion 51.

In other words, as compared with each of the left and right remaining margins (corresponding to the spots of value X) of the first reinforcing fabric 63 and with the distance (corresponding to value Z) between the seams 58S, 51S, a remaining margin 91 (corresponding to the spot of value Y) in a lower portion of the first reinforcing fabric 63 is set to be longer.

Because the lower end of the remaining margin 91 is a free end, the remaining margin 91 may bend at the seam 58S as a proximal end. In this case, because the length Y of the remaining margin 91 is greater than the distance Z between the seams 58S, 51S, if the remaining margin 91 bends, the remaining margin 91 can cover both the seams 58S, 51S for protection. Note that each of the left and right remaining margins (corresponding to the spots of value X) of the first reinforcing fabric 63 may not be limited to a length shorter than the remaining margin 91.

Further, in the embodiment, an upward protruding notch section 92 is formed at the widthwise center in a lower portion of the first reinforcing fabric 63. By the notch section 92, the remaining margin 91 is divided into left and right sides. Accordingly, the left and right remaining margins 91 can bend independently, and thus the left and right remaining margins 91 can independently protect the left and right seams 51S. The left and right seams 51S are located downward of the left and right middle-stitched portions 51.

Figure 8:
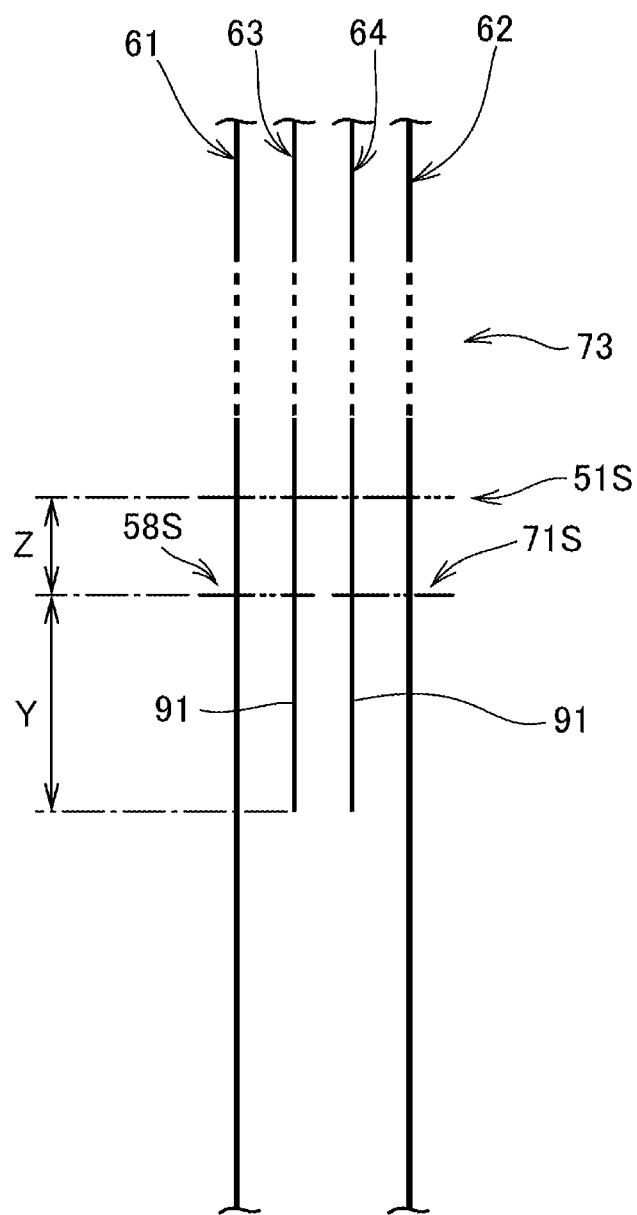
FIG. 8 is a schematic side view illustrating a frontal-side base fabric, first and second reinforcing fabrics and a backside base fabric during airbag non-deployment.
Figure 9:
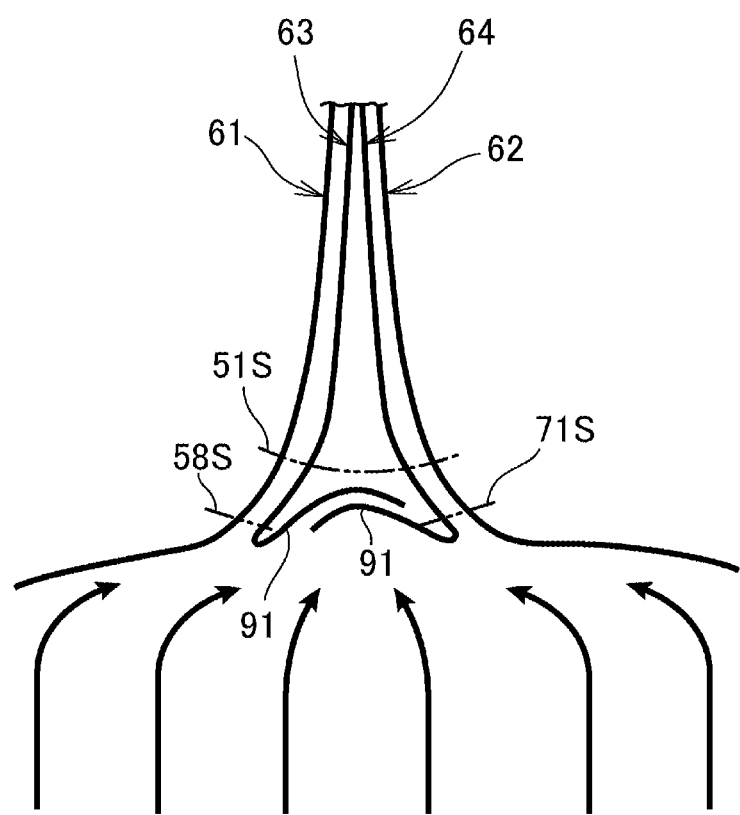
FIG. 9 is a schematic side view illustrating the frontal-side base fabric, the first and second reinforcing fabrics and the backside base fabric during airbag deployment.

FIG. 8 is a schematic side view illustrating the frontal-side base fabric 61, the first and second reinforcing fabrics 63, 64 and the backside base fabric 62 during airbag non-deployment. FIG. 9 is a schematic side view illustrating the frontal-side base fabric 61, the first and second reinforcing fabrics 63, 64 and the backside base fabric 62 during airbag deployment.

Incidentally, for the purpose of clarification, a remaining margin of a lower portion of the second reinforcing fabric 64 is indicated by the same reference sign as the remaining margin 91 of the lower portion of the first reinforcing fabric 63. Further, in FIG. 9, the flow of gas is indicated by the arrows and the holes 73 are omitted.

As shown in FIG. 8, the length Y of each of the remaining margins 91 of the lower portions of the first and second reinforcing fabrics 63, 64 is longer than the separation distance Z between the seams 51S, 58S. As shown in FIG. 9, when the airbag 40 inflates and deploys, by dilation between the frontal-side base fabric 61 and the backside base fabric 62, the pair of seams 58S are stretched to expose the seam 51S and the like, and therefore the seams 51S and the like are easily exposed to the gas. Incidentally, FIG. 9 shows the pair of seams 58S in a state in which the seams 58S are separated extremely from each other for the purpose of clarification of the state.

In the configuration, as shown in the same FIG. 9, when the pair of seams 58S is stretched, the remaining margins 91 in the lower portions of the first and second reinforcing fabrics 63, 64 fall inward by receiving the gas pressure. Thus, the remaining margin 91 of the first reinforcing fabric 63 functions as a shield wall for blocking a flow of gas toward the seam 51S on the frontal-side base fabric 61 side. Likewise, the remaining margin 91 of the second reinforcing fabric 64 functions as a shield wall for blocking a flow of gas toward the seam 51S on the backside base fabric 62 side. As a result, the seams 51S can be protected from the heat of gas throughout the area between the frontal-side base fabric 61 and the backside base fabric 62.

In addition, as illustrated in the same FIG. 9, because the remaining margins 91 of the first and second reinforcing fabrics 63, 64 can overlap each other, the seams 51S can be more effectively protected. Further, the seams 58S at which the first and second reinforcing fabrics 63, 64 are sewn can be protected by the respective remaining margins 91.

Note that a shorter length (value Y) of the remaining margin 91 makes it difficult for the remaining margin 91 to bend even if the remaining margin 91 receives the gas pressure, and even if the remaining margin 91 may bend, the remaining margin 91 may not sufficiently cover the seam 51S. In this case, each of the remaining margins 91 does not adequately function as a gas shield wall, and therefore the remaining margin 91 is desirably formed in a length that allows the remaining margin 91 to be able to bend by the gas pressure to cover the seams 51S and the like to a sufficient degree.

As described above, in the embodiment, the airbag 40 has the seams 51S as a partition portion that partitions the interior of the airbag 40, and the seams 51S are coupling spots along which the frontal-side base fabric 61 and the backside base fabric 62 are coupled with each other. The first and second reinforcing fabrics 63, 64 are provided on the inner sides of frontal-side base fabric 61 and the backside base fabric 62, and the first and second reinforcing fabrics 63, 64 have the remaining margins 91, and the remaining margins 91 are oriented toward the gas supply side in the downward direction rather than being oriented toward the seams 51S. And, each of the remaining margins 91 functions as the shield wall against a flow of gas toward the seam 51S.

With this configuration, the seam 51S on the frontal-side base fabric 61 side can be protected by the remaining margin 91 of the first reinforcing fabric 63, and the seam 51S on the backside base fabric 62 side can be protected by the remaining margin 91 of the second reinforcing fabric 64. Accordingly, the seams 51S can be protected throughout a wide region, and the proper protection of the seams 51S for partition of the interior of the airbag 40 is enabled in a simple configuration.

Further, because the remaining margin 91 of each of the first and second reinforcing fabrics 63, 64 has a length longer than the separation distance (value Z) between the seam 51S and the proximal end of the remaining margin 91 (corresponding to the position of the seam 58S, 71S), the remaining margin 91 is able to cover the seam 51S for protection. This enhances the function of the remaining margin 91 as a shield wall.

Here, on the gas supply side rather than on the seams 51S side, as other coupling spots, the seam 58S and the seam 71S are possessed, the seam 58S provides coupling between the first reinforcing fabric 63 (one of reinforcing fabrics) and the frontal-side base fabric 61, and the seam 71S provides coupling between the second reinforcing fabric 64 (the other reinforcing fabric) and the backside base fabric 62. The remaining margin 91 of each of the reinforcing fabrics 63, 64 extends longer than the separation distance (value Z) between the seam 51S and each of the seams 58S, 71S of the reinforcing fabrics 63, 64. With this configuration, each of the seams 58S, 71S, 51S is able to be protected.

Further, the seam 51S is a coupling spot along which the frontal-side base fabric 61 and the backside base fabric 62 are coupled to each other, and the seam 51S is defined as a seam that provides coupling between a pair of base fabrics 61, 62 with the inclusion of the first and second reinforcing fabrics 63, 64 between the base fabrics 61, 62, the pair of base fabrics 61, 62 constituting the frontal side and backside of the airbag 40. This enables the protection of the seams 51S where the frontal side and backside of the airbag 40 and the reinforcing fabrics 63, 64 are coupled together.

Further, because the first and second reinforcing fabrics 63, 64 are laid respectively on the inner sides of the frontal-side base fabric 61 and the backside base fabric 62, the function of the remaining margin 91 as a shield wall is enhanced.

Further, the remaining margin 91 of the first reinforcing fabric 63 and the remaining margin 91 of the second reinforcing fabric 64 overlap each other when both the remaining margins 91 are bent by the gas pressure, the function of the remaining margin 91 as a shield wall is further enhanced.

Moreover, the configuration includes the middle-stitched portions 51 that provide partial coupling of the frontal side and backside of the airbag 40 to each other to narrow the internal space between the neck portion 41 and the head facing portion 42. The middle-stitched portions 51 are spaced from each other in the width direction of the airbag 40. The seams 51A forming contours of the middle-stitched portions 51 positioned outermost in the width direction are parallel to the side edge portions 40L, 40R of the airbag 40 positioned outside the seams 51A in the width direction, and the seams 51B forming contours opposed to the middle-stitched portions 51 arranged adjacent to each other are approximately parallel to each other.

With this configuration, while the volume of the region from the neck portion 41 to the head facing portion 42 is reduced, a plurality of pillar-shaped gas chambers 53, 54, 55 can be formed to extend from the neck portion 41 toward the head facing portion 42. Accordingly, while upsizing of the inflator 32 is prevented, the proper feeding of gas into the head facing portion 42 is enabled. Note that, the phrase "approximately parallel to" means to include a range having a similar function without being limited to an exactly parallel state.

The separation distances (width W1, W3) between the middle-stitched portions 51 positioned outermost in the width direction and the side edge portions 40L, 40R of the airbag 40 positioned outside the middle-stitched portions 51 in the width direction are equal to the separation distance (width W2) between the middle-stitched portions 51 arranged adjacent to each other. Thus, a plurality of gas chambers has the same width, so that the flow of gas can be easily distributed evenly among the individual gas chambers 53, 54, 55.

Further, because the middle-stitched portion 51 has a shape in which the width is increased gradually with an extension from the neck portion 41 toward the head facing portion 42, the linear-shaped gas chambers 53, 54, 55 are able to be formed effortlessly between the side edge portions 40L, 40R of the fan-shaped airbag 40. Accordingly, the smooth feeding of gas into the head facing portion 42 is facilitated.

Further, because the middle-stitched portion 51 is formed by sewing the frontal side and backside of the airbag 40 together along the contours of this middle-stitched portion 51, the middle-stitched portion 51 is able to be formed through sewing. Accordingly, any dedicated component to form the middle-stitched portion 51 is unnecessary.

Further, because the airbag 40 is equipped with the first and second reinforcing fabrics 63, 64 in the regions of the middle-stitched portions 51, the regions of the middle-stitched portions 51 are reinforced, and therefore the influence of gas can be curbed.

Moreover, the airbag 40 of the configuration includes the upper vent holes 81 and the lower vent holes 82. The upper vent holes 81 are placed upward of the head facing portion 42 and also the upper vent holes 81 are open to the occupant side. The lower vent holes 82 are placed downward of the upper vent holes 81, and also the lower vent holes 82 are open to the opposite side from the occupant.

With this configuration, by virtue of the lower vent holes 82, the control of internal pressure in the airbag 40 is able to be performed from the early stage of deployment of the airbag 40, and after the deployment completion, the internal pressure control is able to be performed through the upper and lower vent holes 81, 82. Further, because the lower vent holes 82 are located on the opposite side from the occupant as well as downward of the occupant, the lower vent holes 82 are hardly blocked by the occupant and/or the like, and also because the upper vent holes 81 are located upward of the head of the occupant, the upper vent holes 81 are not blocked by the occupant. Accordingly, the continuous control on the deployment and inflation of the airbag 40 is facilitated.

Further, the upper vent holes 81 and the lower vent holes 82 are provided in sets of two, and the two upper/lower vent holes 81, 82 are spaced from each other in the lateral direction. Because of this, the internal pressure can be controlled properly.

Further, as illustrated in FIG. 1, the airbag 40 is located at the rear of the handlebar post 9A of the motorcycle 1, and the lower vent holes 82 are placed downward of the handlebar 10 that is supported by the handlebar post 9A. Accordingly, during inflation deployment of the airbag 40, it is possible to prevent the event that the lower vent holes 82 are blocked with the handlebar 10 and other components around the handlebar 10.

Further, in the airbag 40, an area downward of the head facing portion 42 is partitioned into a plurality of gas chambers 53, 54, 55 at intervals in the width direction, and the lower vent holes 82 are placed at entrances of the gas chambers 53, 55, except for the gas chamber 54 arranged in the center in the width direction. With this configuration, gas flowing toward the central gas chamber 54 is not discharged from the lower vent holes 82 and the gas can be fed into the head facing portion 42. Accordingly, the effective feeding of gas toward the widthwise center of the head facing portion 42 is enabled.

Further, the upper vent holes 81 are placed widthwise outward of an extended line from the gas chamber 54 arranged in the center in the width direction, and also the upper vent holes 81 are placed widthwise inward of extended lines from the gas chambers 53, 55 arranged outside in the width direction. Because of this, the upper vent holes 81 are not located immediately above all the gas chambers 53, 54, 55. As a result, after gas has been fed from each of the gas chambers 53, 54, 55 into the head facing portion 42, the gas is able to be discharged in a balanced manner to facilitate controlling the internal pressure.

The above-described embodiment is provided by way of example only in one implementation of the present invention, and any modification and any alternative application are possible without departing from the spirit and scope of the present invention.

For example, in the above embodiment, the case where the first reinforcing fabric 63 is provided on the inner side of the frontal-side base fabric 61 and the second reinforcing fabric 64 is provided on the inner side of the backside base fabric 62 has been described. However, each of the numbers of reinforcing fabrics 63, 64 may be changed. If each of the numbers of reinforcing fabrics 63, 64 to be provided is more than one, a plurality of remaining margins 91 results, and this can cause a further enhancement in the effectiveness as gas shield walls. If each of the numbers of reinforcing fabrics 63, 64 to be provided is more than one, a remaining margin 91 of each reinforcing fabric 63, 64 on one base fabric 61, 62 may have a different length from that of a remaining margin 91 of each reinforcing fabric 63, 64 on the other base fabric 61, 62. An example embodiment of the above case is shown in FIG. 10.

Figure 10:
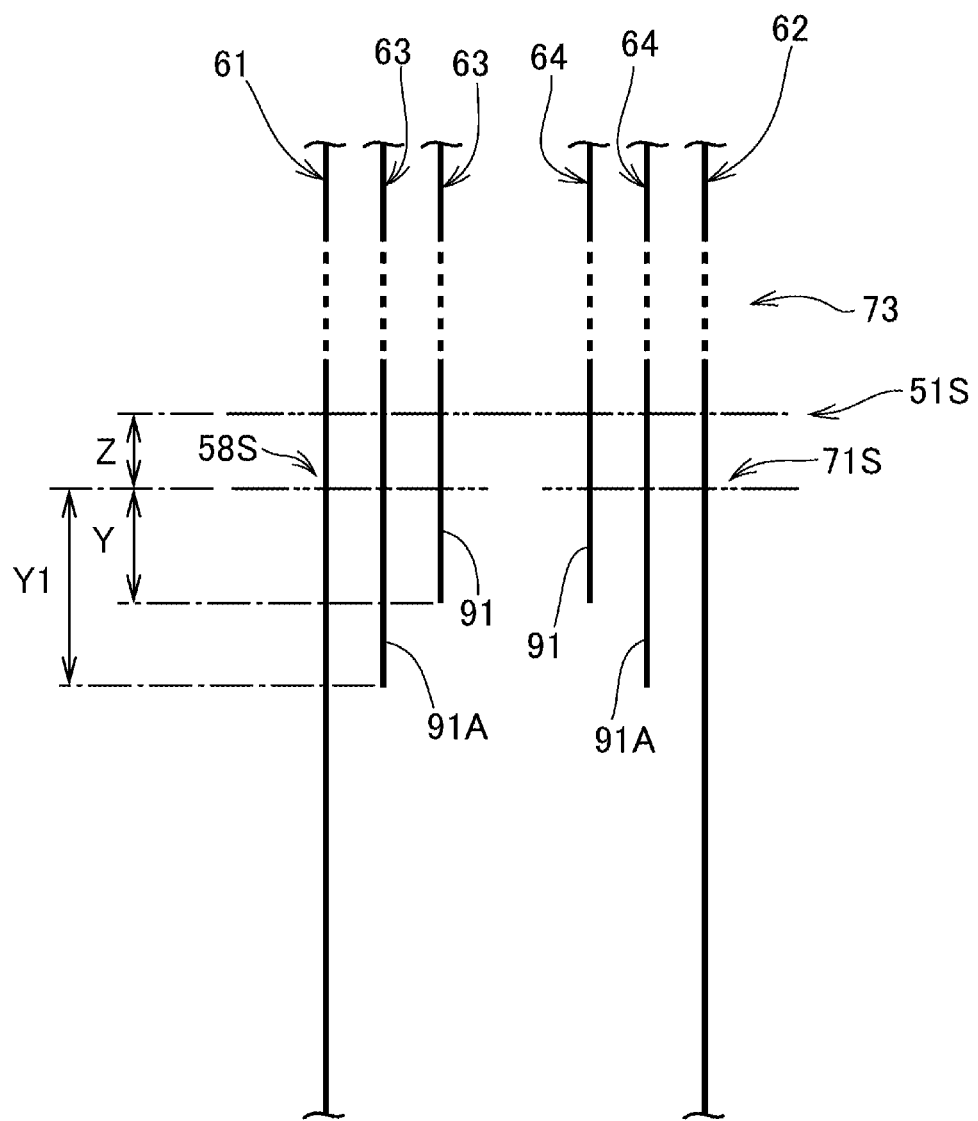
FIG. 10 is a diagram showing an example embodiment of the remaining margins with different lengths.

FIG. 10 illustrates an example embodiment when the remaining margins 91 are different in length. FIG. 10 illustrates a schematically side view of the frontal-side base fabric 61, the first and second reinforcing fabrics 63, 64 and the backside base fabric 62 when the airbag 40 does not deploy.

As shown in FIG. 10, the first reinforcing fabric 63 is situated on the frontal-side base fabric 61, and this first reinforcing fabric 63 has the remaining margin 91 that is formed to have a length longer than another remaining margin 91 of another first reinforcing fabric 63, the another reinforcing fabric 63 being not situated on the frontal-side base fabric 61. The second reinforcing fabric 64 is situated on the backside base fabric 62 and this second reinforcing fabric 64 has also the remaining margin 91 that is formed to have a length longer than another remaining margin 91 (hereinafter indicated with reference sign 91A) of another second reinforcing fabric 64, the another second reinforcing fabric 64 being not situated on the backside base fabric 62 (value Y1>Y>Z in FIG. 10).

As a result, the remaining margin 91A on the base fabric 61, 62 side is more easily bent than the remaining margin 91 on the opposite side from the base fabric, and even when the gas pressure is relatively low, the seam 51S and the like is easily protected by the remaining margin 91A. Further, because the remaining margin 91A overlaps the remaining margin 91 on the inner side of the remaining margin 91A, the effective shield against gas is enabled.

In this case, the example embodiment is not limited to the method of forming both the remaining margins 91A, 91 to have a length exceeding the above value Z, and the length may be changed as appropriate within a range that proper protection can be provided, such that the remaining margin 91 is formed to have a length below the value Z, and the like.

Further, even when a relatively longer remaining margin 91A is not provided, the length of the remaining margin 91 may be less than the value Z as long as the length is within a range that the remaining margin 91 can provide proper protection.

Further, in the above-described embodiment, the positions, shapes and/or the like of the first and second reinforcing fabrics 63, 64 may be changed as appropriate in conformance with the shape or requirements specification of the airbag 40. Further, as to other fabrics 65, 66, 67, 68 (FIG. 6) laid on the frontal-side base fabric 61 or the backside base fabric 62, the numbers of fabrics, the positions and the shapes may be changed as appropriate.

Further, although the frontal-side base fabric 61 and the backside base fabric 62 have been described as independent components in the above-described embodiment, the embodiment is not so limited, and the frontal-side base fabric 61 and the backside base fabric 62 may be a one-piece sheet.

Further, the case where a plurality of gas chambers 53, 54, 55 is defined by the middle-stitched portions 51 and the gas chambers 53, 54, 55 are formed to be identical in width has been described in the above-described embodiment, but the embodiment is not so limited.

Figure 11:
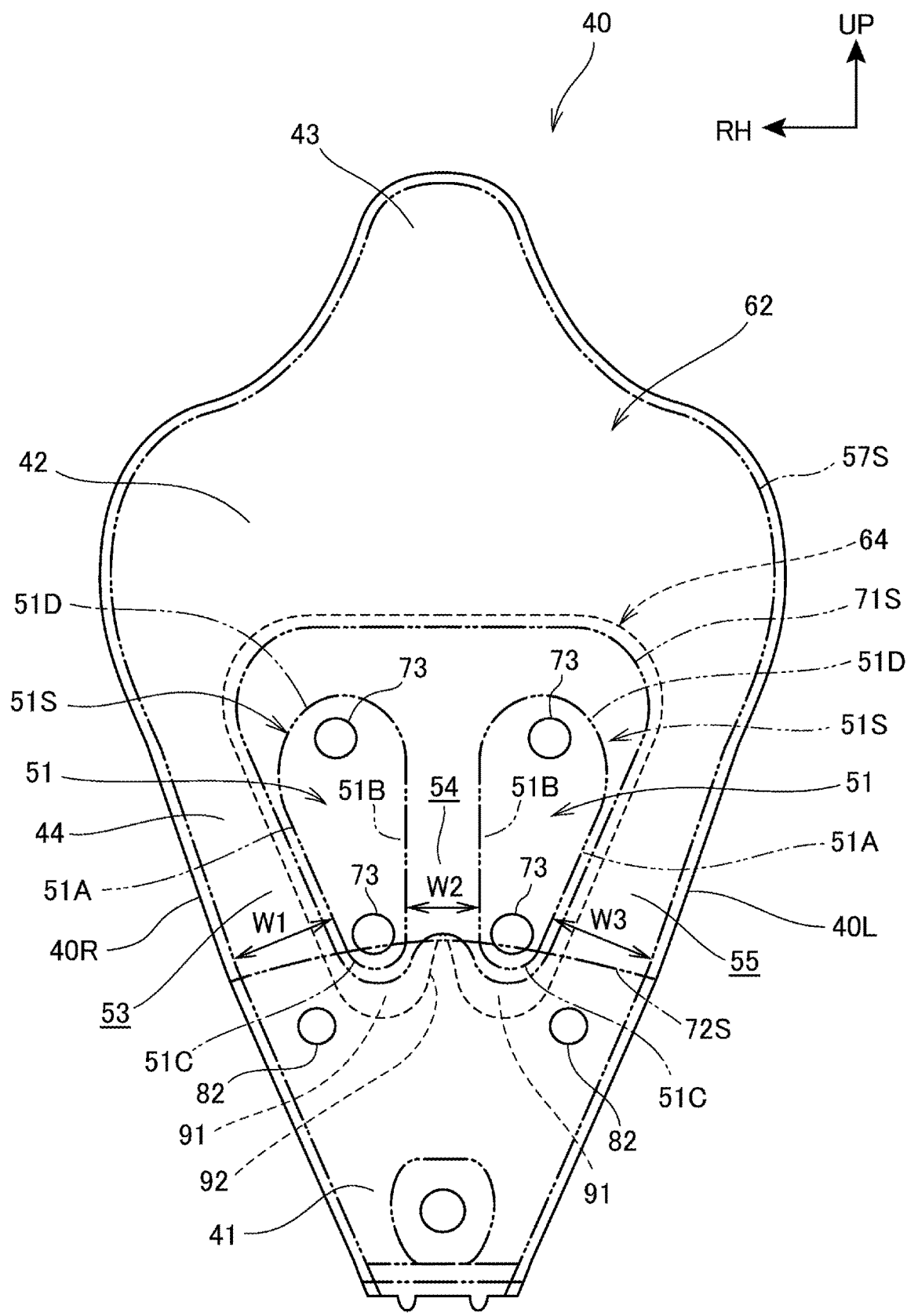
FIG. 11 is a diagram showing an example embodiment of a plurality of gas chambers with different widths.

FIG. 11 is a diagram showing an example embodiment in which a plurality of gas chambers 53, 54, 55 is formed to have different widths.

In FIG. 11, the left and right middle-stitched portions 51 are placed closer to the widthwise center of the airbag 40. As a result, the width W2 of the widthwise central gas chamber 54 is shorter than the widths W1, W3 of the gas chambers 53, 55 that are located outward in the width direction.

With this configuration, it is possible to expect the advantageous effects of facilitating causing the gas to flow into the widthwise outward located gas chambers 53, 55, and therefore, of facilitating the retention of the outer shape of the airbag 40 during airbag deployment. Note that the width W1, W2, W3 of each gas chamber 53, 54, 55, the cross-sectional shape of each gas chamber 53, 54, 55, and/or the like may be changed as appropriate in conformance with requirements specification of the airbag 40.

Further, although the case of providing a pair of left and right middle-stitched portions 51 has been described in the above-described embodiment, the embodiment is not so limited, and three middle-stitched portions 51 or more may be provided at intervals in the width direction.

Further, although the case of coupling individual portions of the airbag 40 to each other by means of sewing has been described in the above-described embodiment, the embodiment is not so limited, and a coupling method other than sewing may be applied. For example, a well-known coupling method, such as a joining method including welding and the like can be widely applied.

Further, although the application of the present invention to the airbag device 30 of the motorcycle 1 has been described, the present invention is not so limited, and the present invention may be applied to airbag devices used in vehicles other than motorcycles. For example, the present invention may be applicable to airbag devices used in saddle riding vehicles and the like. The saddle riding vehicles include the vehicles in general, of which a rider/driver rides astride the vehicle body, and the vehicles are not limited to motorcycles (including motorized bicycles), and the vehicles include other two-wheeled vehicles such as bicycles and the like, three-wheeled vehicles such as ATV (All Terrain Vehicles) and the like, and four-wheeled vehicles.

REFERENCE SIGNS LIST

1 . . . Motorcycle (saddle riding vehicle)
30 . . . Airbag device
40 . . . Airbag
40L, 40R . . . Side edge portion
41 . . . Neck portion
42 . . . Head facing portion
51 . . . Middle-stitched portion (throttle portion)
51S, 57S, 58S, 71S, 72S . . . Seam (partition)
53-55 . . . Gas chamber
61 . . . Frontal-side base fabric
62 . . . Backside base fabric
63 . . . First reinforcing fabric
64 . . . Second reinforcing fabric
81 . . . Upper vent hole
82 . . . Lower vent hole
91, 91A . . . Remaining margin
92 . . . Notch section
W1-W3 . . . Width

The invention claimed is:

1. An airbag device, comprising:
an airbag that is formed in a bag shape to deploy by being supplied with gas, the airbag comprising:
a neck portion through which the gas is introduced during deployment;
a head facing portion, configured to be spaced away from the neck portion and to protectively contact a rider's head when the airbag is deployed, the airbag being increased in width gradually from the neck portion toward the head facing portion; and
a plurality of throttle portions that provide coupling of parts of a frontal side and a backside of the airbag to each other to narrow an internal space between the neck portion and the head facing portion in order to direct gas flow into the airbag during deployment,
wherein the throttle portions are formed at intervals in a width direction of the airbag and cooperate to define a plurality of gas flow channels inside of the airbag, and
outer edge contours of the throttle portions, positioned outermost in the width direction, include portions which are parallel to side edge portions of the airbag positioned outside the outer edge contours in the width direction with the parallel portions of the outer edge contours extending more than half of the total length of one of the throttle portions, and inner edge contours of the throttle portions, arranged adjacent to each other, include portions which are approximately parallel to each other, with the parallel portions of the inner edge contours extending more than half of the total length of one of the throttle portions, whereby each of the gas flow channels has a substantially constant width throughout a large part of its extent in areas thereof proximate the throttle portions.

2. The airbag device according to claim 1, wherein separation distances between the throttle portions positioned outermost in the width direction and the side edge portions of the airbag positioned outside the throttle portions in the width direction are equal to a separation distance between the throttle portions arranged adjacent to each other.

3. The airbag device according to claim 1, wherein separation distances between the throttle portions positioned outermost in the width direction and the side edge portions of the airbag positioned outside the throttle portions in the width direction are greater than a separation distance between the throttle portions arranged adjacent to each other.

4. The airbag device according to claim 1, wherein each of the throttle portions has a shape in which a width is increased gradually with an extension from the neck portion toward the head facing portion.

5. The airbag device according to claim 1, wherein the throttle portions are formed by seaming the frontal side and the backside of the airbag together along the contours of the throttle portions.

6. The airbag device according to claim 1, wherein the airbag includes reinforcing fabrics placed in regions of the throttle portions.

7. An airbag device, comprising:
an airbag that is formed in a bag shape to deploy by being supplied with gas, the airbag comprising:
a neck portion through which the gas is introduced during deployment;
a head facing portion, configured to be spaced away from the neck portion and to protectively contact a rider's head when the airbag is deployed, the airbag being increased in width gradually from the neck portion toward the head facing portion; and
a plurality of throttle portions that provide coupling of parts of a frontal side and a backside of the airbag to each other to narrow an internal space between the neck portion and the head facing portion in order to direct gas flow into the airbag during deployment, wherein the throttle portions are formed at intervals in a width direction of the airbag and cooperate to define a plurality of gas flow channels inside of the airbag, the throttle portions configured and arranged such that each of the gas flow channels has a substantially constant width along a distance which is greater than half of the total length of one of the throttle portions.

8. An airbag device, comprising:
a retainer configured for installation behind a head pipe in an inner cover of a motorcycle;
an airbag that is disposed inside of the retainer in a folded configuration, and is formed in a bag shape to deploy by being supplied with gas, the airbag comprising:
a neck portion through which the gas is introduced during deployment;
a head facing portion, configured to be spaced away from the neck portion and to protectively contact a rider's head when the airbag is deployed, the airbag being increased in width gradually from the neck portion toward the head facing portion; and
a plurality of throttle portions that provide coupling of parts of a frontal side and a backside of the airbag to each other to narrow an internal space between the neck portion and the head facing portion,
wherein the throttle portions are formed at intervals in a width direction of the airbag, and
outer edge contours of the throttle portions, positioned outermost in the width direction, are parallel to side edge portions of the airbag positioned outside the outer edge contours in the width direction, and inner edge contours of the throttle portions, arranged adjacent to each other, are approximately parallel to each other, whereby each of the gas flow channels has a substantially constant width throughout a large part of its extent in areas thereof proximate the throttle portions.

* * * * *